United States Patent [19]

Thompson

[11] Patent Number: 5,439,800
[45] Date of Patent: Aug. 8, 1995

[54] OFFSHORE PETROLEUM EXPLORATION SYSTEM

[76] Inventor: Keith F. M. Thompson, 878 Augusta, Houston, Tex. 77057

[21] Appl. No.: 261,763

[22] Filed: Jun. 17, 1994

Related U.S. Application Data

[63] Continuation of Ser. No. 2,720, Jan. 11, 1993, abandoned.

[51] Int. Cl.$^6$ .......................... G01N 33/24; G01V 3/00
[52] U.S. Cl. .......................................... 435/9; 435/291; 436/28; 436/29; 436/121; 436/151; 73/170.32; 204/153.19; 324/348
[58] Field of Search ............................ 435/9, 287, 291; 436/25, 28, 29, 120, 121, 149, 151, 806; 73/61.41, 61.43, 153, 170.32; 324/71.1, 72, 72.5, 425, 365, 348; 340/855.6; 204/153.19, 419

[56] References Cited

U.S. PATENT DOCUMENTS

| | | | |
|---|---|---|---|
| 3,711,765 | 1/1973 | Overton | 73/153 X |
| 4,157,283 | 6/1979 | Zetter | 204/153.19 |
| 4,293,309 | 10/1981 | Miller | 436/29 |
| 4,360,359 | 11/1982 | Oehler | 436/28 |
| 4,441,980 | 4/1984 | Warne | 324/425 |
| 4,780,185 | 10/1988 | Driscoll et al. | 204/153.19 |
| 5,116,759 | 5/1992 | Klainer et al. | 435/288 |
| 5,328,849 | 7/1994 | Smith | 436/29 X |

FOREIGN PATENT DOCUMENTS 0005872 12/1979 European Pat. Off. ............ 324/365

OTHER PUBLICATIONS

Bauer et al., "Radiocarbon Evidence of Fossilcarbon Cycling in Sediments of a Nearshore Hydrocarbon Seep", *Nature*, vol. 348, Nov. 15, 1990, pp. 230-232.

Davis et al., "Infaunal Benthos of a Natural Petroleum Seep: Study of Community Structure"., *Marine Biology.*, 59, 31-41 (1980).

Fenchel et al., "The Sulfide System: a New Biotic Community Underneath the Oxidized Layer of Marine Sand Bottoms.," *Marine Biology.*, 7, 255-268 (1970).

Shokes, Rate-Dependent *Distributions of Lead-210 and Interstitial Sulfate in Sediments of the Mississippi River Delta.,* Dissertation: Texas A&M Univ., May 1976.

*Primary Examiner*—Robert J. Warden
*Assistant Examiner*—Theresa T. Snider
*Attorney, Agent, or Firm*—Pravel, Hewitt, Kimball & Krieger

[57] ABSTRACT

A system is provided for locating and delineating sea floor occurrences of petroleum seepage, achieved by apparatus for the detection of the resulting abnormal distribution of electrical potential within the affected sediments. The system uses an electrically insulating probe, deployed by steel cable from a ship, for the implantation of numerous electrodes within the sediment at depths between 60 cm and 5 m. Insulated conductors within the probe connect the electrodes to a reference electrode by way of an electrometer which facilitates measurement of the difference in electrical potential between any one of the probe electrodes and the reference electrode. Digital measurements are conducted to an associated acoustic modem and thence to the ship through the water. The system allows rapid assessments of sedimentary electrical conditions over large areas of seafloor by the repeated introduction, utilization, withdrawal, and relocation of the probe. Similarly, occurrences of dumped organic refuse, sewage sludge, or other organic matter, might be delineated.

9 Claims, 4 Drawing Sheets

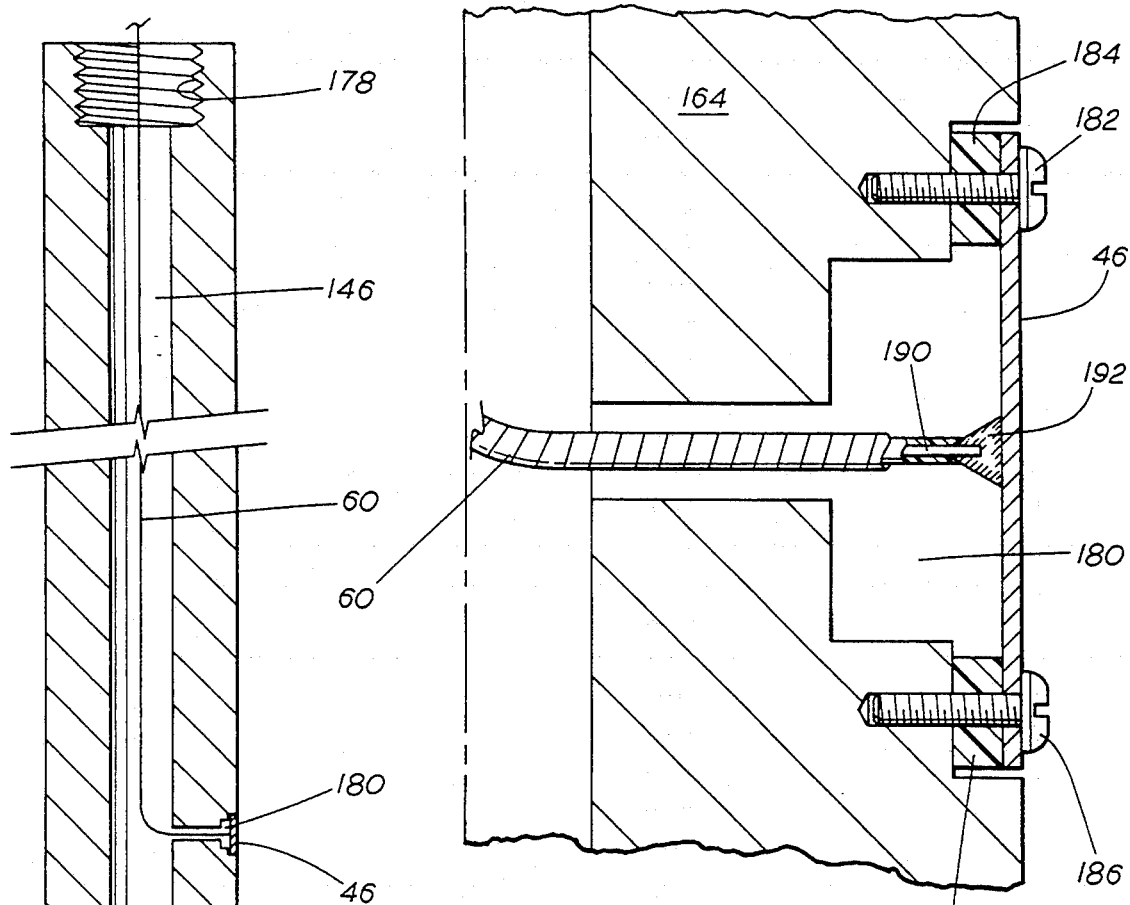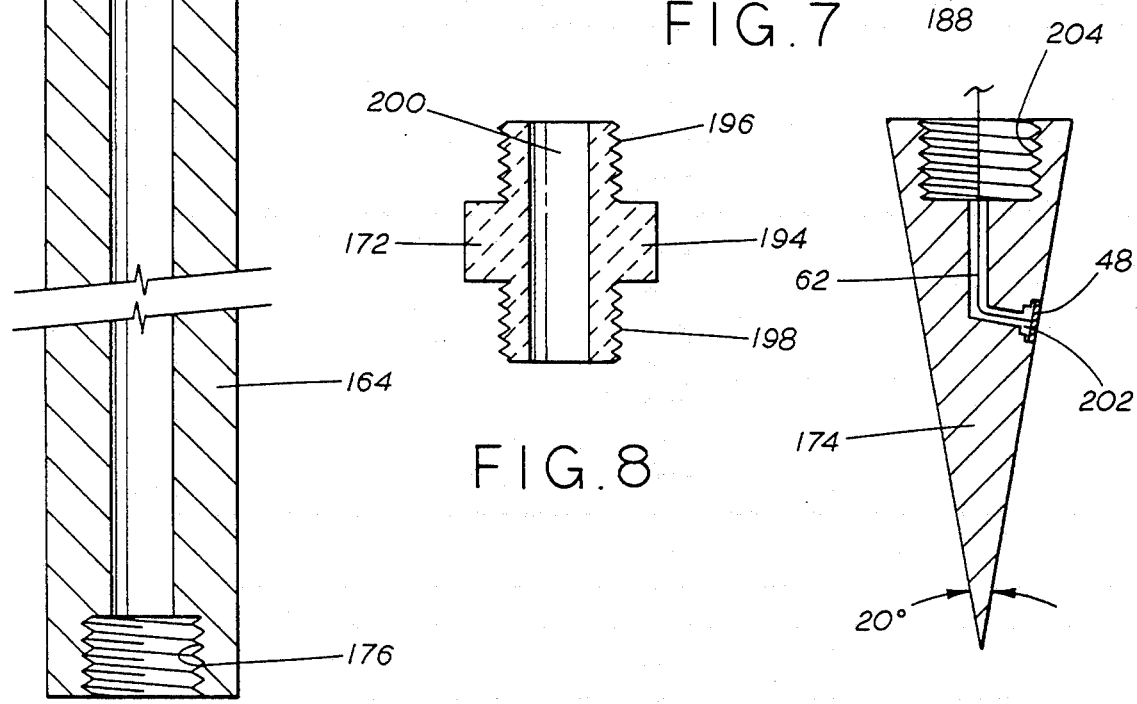

OFFSHORE PETROLEUM EXPLORATION SYSTEM

This is a continuation of application Ser. No. 08/002,720 filed on Jan. 11, 1993, now abandoned.

BACKGROUND OF THE INVENTION

1. Field of the Invention

The invention is primarily of value in offshore exploration for petroleum, secondarily, in studies of anthropogenic environmental pollution in the marine realm. The mode of operation relies upon phenomena resulting from the bacterial metabolism of organic matter, whereby numerous classes of bacteria, acting sequentially, change marine sediments from an oxidized to a reduced state. These processes can be monitored through the accumulation or destruction of a variety of inorganic compounds, the most important of which determine the electrical condition of the sediment. Therefore, in the present embodiment of the invention the processes are monitored electrically. Pollution or petroleum seepage can be monitored electrically, as described in the present application.

2. Description of Related Art

The following U.S. Patents were found to be the closest prior art patents regarding the present application but none of these patents shows or suggests, alone or in combination, the disclosure of the present application.

| | | |
|---|---|---|
| 4,310,057 | 1/1982 | Brame |
| 4,319,482 | 3/1982 | Bunner |
| 4,340,391 | 7/1982 | Demaison et al. |
| 4,335,622 | 6/1982 | Bartz |
| 4,444,889 | 4/1984 | Demaison et al. |
| 4,574,118 | 3/1986 | Demaison et al. |
| 4,659,675 | 4/1987 | Demaison et al. |

THE NORMAL DEVELOPMENT OF HYDROGEN SULFIDE IN MARINE SEDIMENTS

The normal seawater/subjacent-sediment system universally exhibits an uppermost, oxidized, electrochemical zone with a positive electrical potential, and a deeper reduced zone with a negative potential. Bacterial generation of hydrogen sulfide characterizes the reduced zone. Electrical disequilibrium is maintained by the bacterial metabolism of the natural supply of labile organic matter and concomitant transformation of inorganic components dissolved in sea water. The normal depth to the reduced zone varies from 0.01 m to over 10 m, depending upon the natural rate of provenance of organic matter.

A potential difference of the order of 450 millivolts between a reference electrode at seawater potential and an electrode embedded within the sediments of the sea floor is sufficient to prove that the generation of hydrogen sulfide is taking place. There are four prerequisites for such generation: (1) the presence of sulfate ion, (2) of sulfate-reducing bacteria, (3) of an adequate supply of organic matter, and (4), the absence of dissolved oxygen. Requirements (1) and (2) are universally satisfied in the marine environment; (4) is ultimately brought about in the sediments by the activity of oxygen-consuming bacteria; (3) may be met either by organic detritus from recently living organisms, or by the abnormal addition of organic matter, e.g., the entry of petroleum seeping from accumulations at depth. It is possible to distinguish between these alternative sources of organic carbon by mapping the depth to the onset of hydrogen sulfide generation.

The depth to the sulfide zone is regularly distributed in the instance of recent organic sources, but is quasi-randomly distributed in the case of petroleum seepage. The present system is principally directed toward the detection of petroleum seepage, and the apparatus is designed with this objective in view. Nevertheless, only minor modifications are required to facilitate the application of the apparatus to the search for, and delineation of the occurrence of, abnormally contributed anthropogenic organic matter, such as sewage sludge.

As shown by Fenchel and Reidel (Marine Biology, 1970, Vol. 7, p. 255–268), the sulfide zone, or system, occurs universally in marine sediments. It is an anaerobic (extremely oxygen-deficient) environment established under a cover of oxidized sediments at depths below the surface ranging from a few centimeters to tens of meters. The depth is determined by, and equilibrium between, oxygen depletion and oxygen renewal. Depletion is brought about by oxygen-consuming (aerobic) bacteria, renewal by the diffusion of oxygen from sea water. When oxygen is exhausted anaerobic bacteria rapidly become dominant. Chief among these are the sulfate-reducing type which release hydrogen sulfide. The sulfide zone is encountered at depths of 1 to 50 cm in bays, inlets, estuaries, and along open coastlines. The upper surface of the sulfide zone is readily contourable and mappable, an expression of the regularity of its development. For example, Fenchel and Reidel found the top of the sulfide zone to consistently occur 30 cm below the surface at a relatively constant distance of 0.3 miles offshore, along more than 8 miles of shoreline in Onslow Bay, N.C.

A further, and remarkable, demonstration of the regularity of the development of the sulfide zone, of major importance for the application proposed here, was provided by the data of Shokes (1976) shown in FIG. 1 and explained in greater detail later. Shokes found that, over the entire domain of sedimentation of the Mississippi River (covering most of the Gulf of Mexico), the depth to the sulfide zone varied regularly with the rate of sedimentation. At the mouth of the river the sulfide zone occurs at a uniform depth of 75 cm. It deepens progressively until, in the deepest water sampled, it occurs at depths greater than 7 meters. The correlation coefficient relating sedimentation rate and sulfide reduction rate was 0.98. Thus, from the coastline to oceanic water depths, the depth of the sulfide zone within the sediments can be expected to increase continuously, and to be uniform over large areas.

The basis of the relationship discovered by Shokes is that "detrital" organic matter of natural origin is normally and invariably present in sea floor sediments. It comprises detritus from remnants or traces of once-living organisms which settles to the sea floor along with sedimentary mineral particles. The greater the rate of sedimentation, the more rapidly organic matter is deposited, and the more numerous become the bacteria within the sediments. Their enhanced activities result in decrease in the depth to the top of the sulfide zone.

THE ABNORMAL DEVELOPMENT OF HYDROGEN SULFIDE IN MARINE SEDIMENTS: MODIFICATION BY PETROLEUM SEEPAGE OR ANTHROPOGENIC AGENCY

Although petroleum is obviously of natural origin, it is only rarely present in marine sediments, and represents organic matter of abnormal provenance when it seeps upward from great depth into the surface sediments. Likewise, anthropogenic organic matter represents an abnormal contribution. Both petroleum, and anthropogenic waste, represent food material for bacteria, enhancing their numbers and activities.

The first claim that petroleum in seepages comprises the base of a marine food chain appears to have been made by Spies and Davis, Marine Biology, 1979, Vol. 50, p. 227-238.

If the rate of delivery of organic matter is abnormally increased, abnormal conditions of the distribution of bacterial zonation and of electrical potential develop. The top of the sulfide zone is artificially raised toward the sediment surface. The depth to the top of the sulfide zone, (synonymous with the occurrence of hydrogen sulfide) can be determined by carrying out electrical measurements. If this depth shows rapid variation from place to place, is non-uniform, locally abnormally shallow, develops a patchy distribution, lineaments, or other departures from the regional, normal, uniformity of depth, then the occurrence of petroleum seepage is very strongly suggested, barring evidence of anthropogenic dumping. The latter tends towards surficial modification, seepage towards modification within the sediment column.

Petroleum hydrocarbons are metabolized by a great variety of bacteria always present in marine sediments. The bacteria are consumed in turn by the meiofauna, largely comprising a variety of worms, and the meiofauna by the macrofauna. The latter includes crabs and shellfish. The unique tubeworms which characterize these "chemosynthetic" communities are symbiotic (directly dependant upon) sulfide-oxidizing bacteria. Firm evidence of the utilization of petroleum carbon for building tissue was provided by Bauer, et al., (Nature, Nov. 15, 1990) who showed that at a seep near Coal Oil Point, Calif., the macrofauna were made up of only 35% modern carbon, and 65% petroleum-derived carbon, based on measured carbon-14 activity.

The discovery of petroleum seepage, and the assessment of such regularity as it can exhibit, e.g., occurrence along outcropping fault traces, can be of significant value in petroleum exploration. There is need to determine as soon as possible in the course of exploration of any given subsea region whether petroleum has been generated in the subsurface. In an extremely large proportion of instances, petroleum generation, followed by migration into subsurface traps, is accompanied by the escape of some fraction of the petroleum to the surface, where it manifests itself as seepage. Large scale petroleum seepage has led in the past to the discovery of numerous of the world's most important petroleum provinces. Minor seepages are also unequivocal and valuable indicators of the presence of petroleum at depth.

Seafloor seepages have been detected to date by direct observation from submersible vehicles, by inference based on geophysical surveys, and by the analysis of sediment samples. All of these endeavors are widely and extensively practiced in the course of offshore petroleum exploration. Obtaining sea floor sediment samples (cores) in areas of seepage has the advantage of providing traces of petroleum suitable for geochemical analysis, so that an appraisal can be made as to the nature of the potentially exploitable hydrocarbons. It is possible to distinguish gas-plus-condensate from oil, to estimate the original API gravity, and to distinguish whether the oil is sulfur-rich, or sulfur-poor. However, no information from the cores is available until laboratory analyses are completed after the lapse of a significant period of time. Secondly, locations at which cores are to be taken must be decided in advance. Random or grid locations must be chosen unless geophysical records are available showing likely seepage sites, such as areas of gas-charged sediment, or shallow faulting. What is later discovered in the analyses is in part a matter of chance, as cores cannot be positioned on the seafloor with precision.

The present invention overcomes these limitations to a significant degree. Anomalous depths to the sulfide zone and occurrences of hydrogen sulfide in deep water sediments can only be due to the presence of seeping petroleum. With a cable-suspended probe, and instantaneous readings of electrochemical potential available on the ship above, real-time mapping can be carried out to determine the extent, boundaries, limits, and configurations of seepage-affected sediments. The probability of the presence of otherwise undetected seepage on the sea floor can be raised to a high level. For confirmation, optimum locations for the retrieval of sediment samples can be selected. Maps obtained of seepage locations can later be interpreted with advantage by petroleum explorationists. Areas for detailed geophysical examination can be chosen.

In regions of prolific seepage, the top of the sulfide zone can be raised to the extent that it coincides with the sediment-water interface. This promotes the growth of surface mats of the white/orange bacterium Beggiatoa which subsists by oxidizing upwardly diffusing hydrogen sulfide. Such bacteria contribute significantly to the food chains developed in chemosynthetic communities (principally of tube worms and mussels) in the deep Gulf of Mexico. It is predicted that the depth to the surface of an anomalous sulfide zone relates to the size or activity of the associated seepage.

The following data (Table 1) demonstrate that sediments having anomalous concentrations of hydrogen sulfide bear exceptionally high levels of petroleum hydrocarbons. These data, previously unpublished, are compiled (with permission) from the files of British Petroleum (BP) Exploration Company, Houston, Tex., and represent unspecified locations in waters of depths greater than 600 feet in the Gulf of Mexico.

TABLE 1

Comparison of concentrations of petroleum hydrocarbons detected in sediment cores four meters in length in relationship to the presence or absence of hydrogen sulfide.

| Measured Compound | Observed Mean Concentration | |
| --- | --- | --- |
|  | Hydrogen Sulfide Present (274 Analyses) | Hydrogen Sulfide Absent (1967 Analyses) |
| Methane | 17,075 ppm | 355 ppm |
| Ethane | 165 ppm | 2.5 ppm |
| Propane | 31 ppm | 1.0 ppm |
| N-Butane | 3.9 ppm | 0.3 ppm |
| Aromatic Hydrocarbons | 45,174 units* | 2,970 units* |

TABLE 1-continued

Comparison of concentrations of petroleum hydrocarbons detected in sediment cores four meters in length in relationship to the presence or absence of hydrogen sulfide.

| Measured Compound | Observed Mean Concentration | |
|---|---|---|
| | Hydrogen Sulfide Present (274 Analyses) | Hydrogen Sulfide Absent (1967 Analyses) |
| (total) | | |

*units are arbitrary but consistent, measured by ultraviolet spectroscopy.

The data of Table 1 show that only 274 (12.2%) of the 2241 locations examined by coring exhibit hydrogen sulfide, encountered towards the base of the cores. It is clear that the great majority of the cores which exhibit extremely high concentrations of hydrocarbons due to petroleum seepage possess detectable hydrogen sulfide. Hydrocarbons which do not normally occur in seafloor sediments are significantly elevated in the hydrogen sulfide-bearing cores, by an average factor of 66-fold in the case of ethane, to 13-fold in the case of n-butane. Numerous of the sulfide-bearing cores contained visible traces, films, or droplets of crude oil which could be correlated with oil from reservoirs at depth. Hydrogen sulfide can therefore be employed as a pathfinder for petroleum seepage.

Various regions of the floor of the Gulf of Mexico exhibit major differences in the proportion of cores recovered bearing hydrogen sulfide. Large areas of no occurrence exist. Fairways known to be oil-productive occur, within which as many as 38% of cores are sulfide-positive. Hydrogen sulfide due to petroleum seepage has also been encountered in the sediments of the North Sea, on the Campeche Shelf off of Yucatan, Offshore California, and elsewhere.

SUMMARY OF THE PRESENT INVENTION

The present invention seeks to discover petroleum seepage on the seafloor, that is, natural leakage from subsurface reservoirs of gas or oil, by an indirect procedure and by remote sensing. By "indirect procedure" is meant that no chemical analytical process is carried out seeking actual petroleum components. Rather, the invention seeks electrical signals reflecting the occurrence of a series of changes which can only be due to the presence of petroleum components in the sediments at the sea floor. By "remote sensing" it is meant that observations are made from a ship using digitally programmable instruments with capabilities for two-way communication, lowered to the sea floor by steel cable.

The preferred embodiment of a device for the intended purposes comprises the following essential parts: a cylindrical probe, 8 cm in diameter, and 5.1 meters in length, deployed from a ship by steel cable, eventually falling rapidly under gravity to penetrate the sediments of the seafloor. The probe carries five, insulated, platinum electrodes on its surface, spaced along its length at an average spacing of 0.85 meters. The key to inferring the presence of petroleum seepage lies in determining the depth, to the nearest 0.5 meter, of the transition from oxidized sediment at the sea floor to reduced sediment bearing hydrogen sulfide, the "sulfide zone". This depth is estimated by measuring the difference in electrical potential between the reference electrode and each of electrodes individually and sequentially, employing an analog signal multiplexer, or scanner. This and other instrumental components are housed in a pressure-resistant cylinder immediately above the probe.

Measurements are made by a high input impedance electrometer. Digital data are transmitted to the ship by means of a system of acoustic modems and transducers located at the top of the probe and shipboard. Upon completion of a set of readings the ship's position and water depth are recorded, the probe is winched out of the sediments and lifted to sufficient height above the seafloor to enable the ship to move to nearby location. The sequence is repeated in order to map the top and geographic distribution of the sulfide zone. This determines whether or not these characteristics are normal or abnormal, the latter in almost all cases indicating the occurrence of petroleum seepage.

BRIEF DESCRIPTION OF THE DRAWINGS

FIG. 6 is a sectional, side elevational view of part of the probe shown in FIG. 5a;

FIG. 7 is an enlarged, sectional, side elevational view of part of the electrode in FIG. 6;

FIG. 8 is a sectional, side elevational view of a connector coupling for the probe shown in FIG. 5a; and FIG. 9 is a sectional, side elevational view of the lower segment of the probe shown in FIG. 5a.

DESCRIPTION OF THE PREFERRED EMBODIMENT

Figure 1:
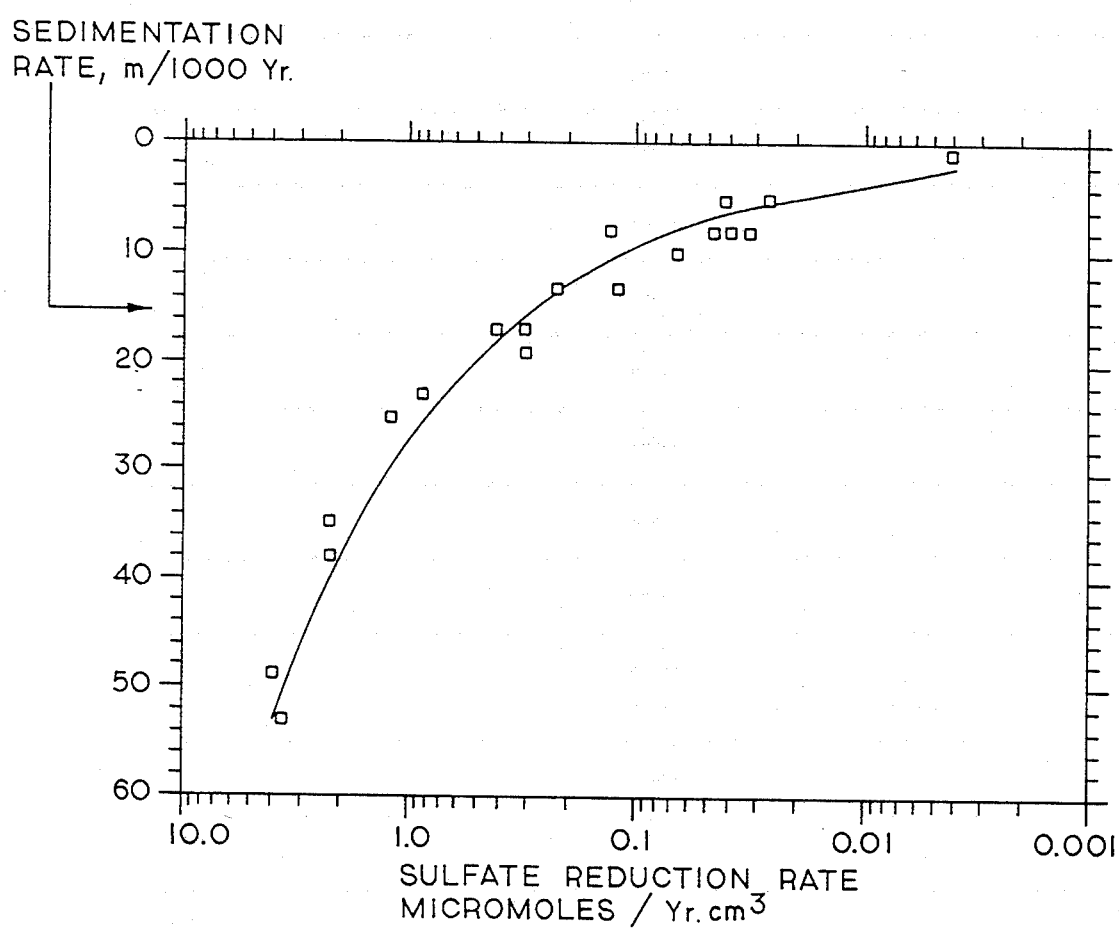
FIG. 1 is a chart showing regularity of relationship between rate of sedimentation and the bacterial reduction of sulfate ion ($SO_4^{--}$) in sediments over a large area of the Gulf of Mexico (After Shokes, Texas A&M University, 1976)

FIG. 1 after Shokes (1976), is a chart showing regularity of the relationship between rate of sedimentation and the bacterial reduction of sulfate ion ($SO_4^{--}$) in sediments over a large area of the Gulf of Mexico. These observations are vital to the rationale of the present invention, as follows. Bacterial sulfate reduction leads to the development of a sulfide zone and the generation of negative electrical potential in marine sediments. As sedimentation rates vary slowly and regularly over large areas of the sea floor, localized, shallow occurrences of the sulfide zone must represent abnormal introductions of bacterial nutrients, namely, petroleum hydrocarbons.

Figure 2:
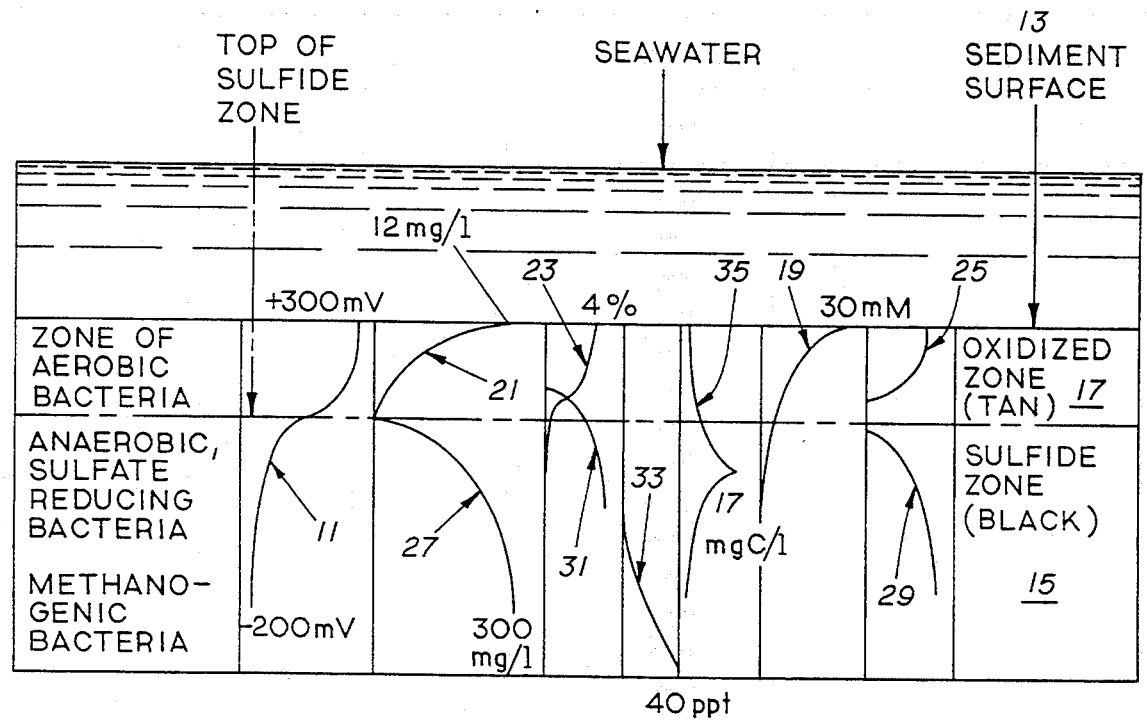
FIG. 2 is a chart of profiles of progressive changes in selected variables in marine sediments (After Fenchel and Reidel, 1970)

FIG. 2, after Fenchel and Reidel (1970), is a chart of profiles of progressive changes in selected variables in marine sediments. Specifically shown are changes in chemical composition in relation to changes in electrical potential, conventionally designated "Eh", shown by curve 11, from values of the order of +300 millivolts (mv) at the sea floor 13, to −200 mv within the sulfide zone 15. The three principal groups of bacteria which occur everywhere in marine sediments are shown. Each occupies a specific zone and universally brings about a series of chemical changes, each characteristic of a zone. As illustrated, the oxidized zone 17 is characterized by decreasing levels of sulfate ion 19, oxygen content 21, ferric iron (Fe$^{+++}$)23, and nitrite ion 25. The anaerobic sulfide zone is characterized by increasing concentrations of hydrogen sulfide (H$_2$S) 27, ammonium (NH$_3$) and phosphate ion (PO$_4^{---}$) 29, ferrous ion (Fe$^{++}$)31, and methane (CH$_4$)33. Methane is generated by bacteria in the deepest zone, using carbon dioxide 35 generated in the zones above.

Aerobic bacteria in the uppermost sediments utilize oxygen dissolved in seawater for the consumption of detrital organic matter. When dissolved oxygen is exhausted, the anaerobic sulfate-reducing bacteria become dominant, obtaining oxygen from the dissolved sulfate ion of seawater, present as an interstitial fluid. These bacteria break down sulfate ion, obtaining oxygen for their life processes, and releasing sulfur as hydrogen sulfide. The following reaction, driven by bacterial energy, can be written to summarize this, though it does not represent the actual steps:

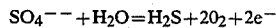

$$SO_4^{--} + H_2O = H_2S + 2O_2 + 2e^-$$

That is, water plus sulfate ion yields hydrogen sulfide plus free electrons. The reaction represents the dominant electrochemical change in the zone of activity of sulfate-reducing bacteria. In electrochemical terms it is the dominant half-cell reaction, setting up a negative electrical potential within the sediments, generally observed to be of the order of −200 millivolts at the pH of seawater. On the other hand, Eh values measured in surface-layer sediments, provided that the bottom water contains dissolved oxygen, are commonly +200 to +300 mv. The potential difference between the surface and the sulfide zone can therefore be as high as 500 mv.

Figure 3:
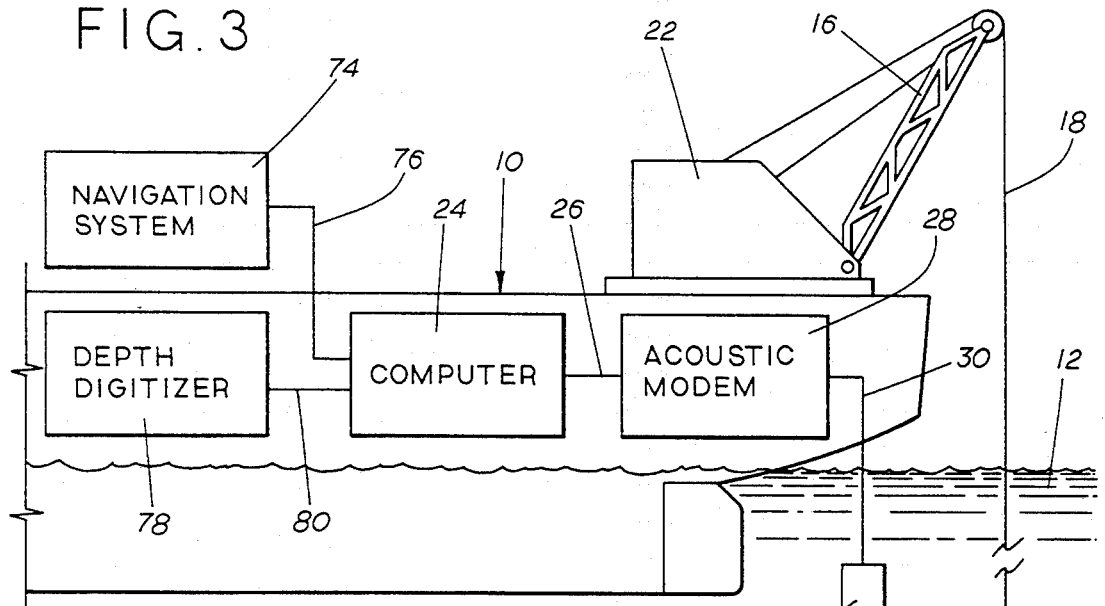
FIG. 3 is a block diagram and side elevational view of components of the petroleum exploration system of the present invention.

FIG. 3 is a block diagram and side elevational view of components of the petroleum exploration system of the present invention. A ship 10 is floating on a body of seawater 12 having a floor 14. An A-frame 16 is positioned at the stern of the ship 10 and allows lowering overboard of a steel cable 18 to which an elongate probe 20 is attached. A winch 22 is capable of raising as much as 2,000 meters of cable and the attached load at a rate of several hundred feet per minute to deploy the probe 20. Steel cable 18 is solely of a load-bearing nature and does not carry electrical power or data.

Use of the system of the present invention is implemented by way of a personal computer (PC) based work station 24 which may employ an IBM TS/1486SX/20 computer. In one possible mode of operation of the system of the present invention, probe 20 is lowered to within 6 meters of the floor 14 and then allowed to fall freely to implant itself in the sediment of floor 14. A digital trigger code is transmitted from the keyboard of computer 24 through line 26 to the shipboard Datasonics acoustic modem 28 (ATM-851) then through line 30 to the AT-418 transducer 32 where the electrical signal is converted to acoustic data and transmitted with error detection at 14 kHz, 1200 bits/second. Transmission of the signal through the water reaches the receiver 34 associated with the probe. Receiver 34 may be a Datasonics ATM-845. Receiver 34 also is shown to be an acoustic modem and transducer in FIG. 4.

Figure 4:
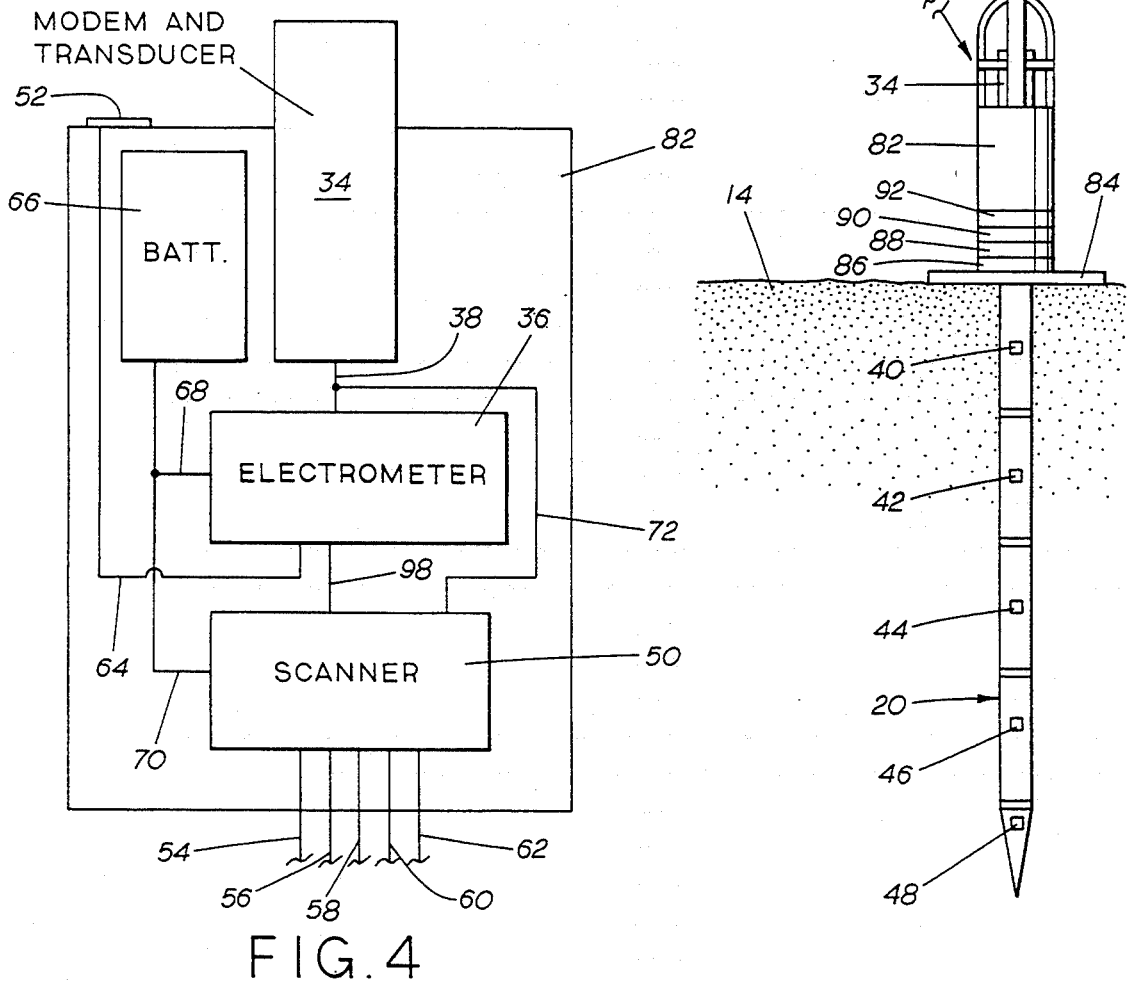
FIG. 4 is a block diagram of the components of the instrument housing shown in FIG. 3.

FIG. 4 is a block diagram of the components of the instrument housing shown in FIG. 3. Reconversion of the trigger signal, acoustic to digital, takes place in the receiver 34 which, as pointed out previously, is an acoustic modem and transducer. The trigger signal activates the microprocessors of the Keithley Model 617 electrometer 36, and the Keithley Model 705 Scanner 50. Various time-based programs of electrode interrogation can be implied. In one possible mode of operation each insulated electrode 40, 42, 44, 46, and 48 can be connected to the electrometer and reference electrode 52 for one second in five. Scanner 50 and electrometer 36 can be instructed to execute one voltage measurement every 45 ms while any given electrode is so connected whereby 20 measurements per second can be obtained. The suite of 100 measurements per scan equals the data storage capability of electrometer 36. Data suites can be transferred to host computer 24 during the subsequent scan. Lines 54, 56, 58, 60 and 62 are connected respectively to electrodes 40, 42, 44, 46 and 48. Reference electrode 52 is connected to electrometer 36 through line 64. Battery 66 provides power for the components through lines 68 and 70. Line 72 carries digital data between line 38 and scanner 50.

At each measurement site representing a single insertion of the probe 20, a suite of electrical measurements is obtained and stored on the hard disk of computer 24 in association with logistical information such as geographic positional data from the navigation equipment of ship 10, particularly data from navigation system 74 in FIG. 3 which may be an Accufix Precision Navigation Receiver, (Megapulse Inc.), connected through line 76 to computer 24. A depth digitizer 78 which may be a PD$^3$-2000 Precision Depth Digitizer and Display (SeaBeam Instruments, Inc.), is connected through line 80 to computer 24.

It will be appreciated that instrument housing 82 is positioned above probe 20. Disk 84 is positioned above the probe 20 to limit penetration of the sediment and above disk 84 are weights 86, 88, 90 and 92 to cause the probe 20 to penetrate the sediment in floor 14 during the free-fall of the probe.

Line 98 carries the signal from the electrodes located in probe 20 and is connected between scanner 50 and electrometer 36.

Figures 5, 5A:
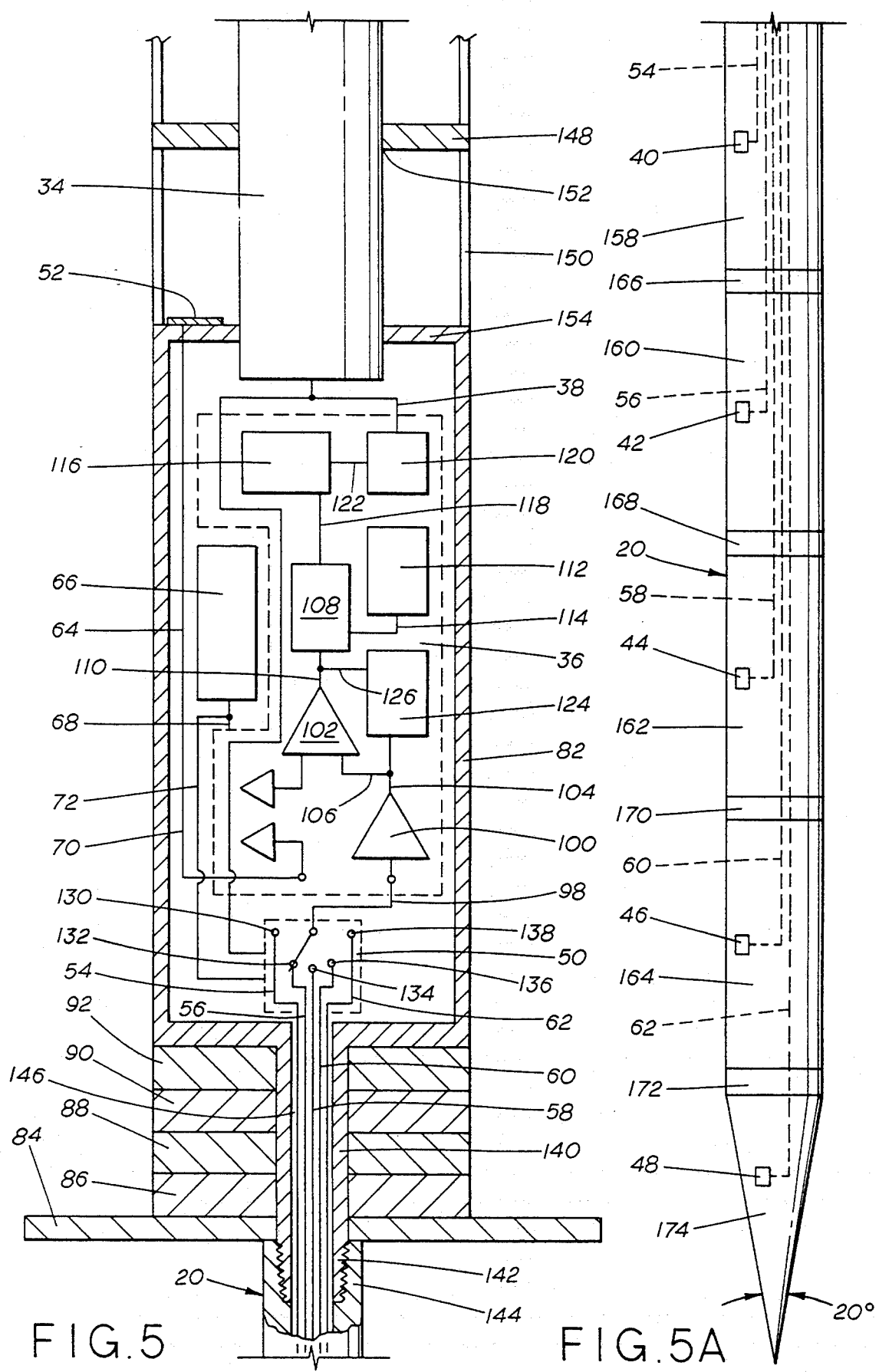
FIG. 5 is a sectional, side elevational view of the electrical measurement component shown in FIG. 4.
FIG. 5a is a side, elevational view of the probe shown in FIG. 3.

FIG. 5 is a sectional, side elevational view of the electrical measurement component shown in FIG. 4. The electrical measurement system comprises an electrometer 36 which may be a Keithley Model 617 electrometer which features extremely high input impedance (2×10$^{14}$ ohms) so that virtually no current is drawn from the natural system under investigation when measurements are made. Electrometer 36 incorporates a JFET (Junction Field Effect Transistor) preamplifier 100 as the first stage providing the requisite input impedance. Preamplifier 100 feeds an operational amplifier 102 through line 104 and line 106. The output of operational amplifier 102 goes to an analog to digital converter 108 through line 110. Converter 108 employs a precision reference voltage source 112 through line 114. The electrometer 36 incorporates a microprocessor 116 connected to converter 108 through line 118. Instrumentation 120 may be an IEEE-488 Digital Interface for Programmable Instrumentation facilitating automation of measurement collection. Instrumentation 120 is connected through line 122 to microprocessor 116 and through line 38 to acoustic modem 34. Electrometer settings of range, function (measurement of current, resistance, or voltage), zero check, and store and transmit data are conveyed from the computer workstation 24 to the IEEE-488 interface instrumentation 120 and thereafter to the function selector 124 which is connected through line 126 to line 110. Power from battery 66 is provided to the electrometer 36 through line 68 and to the scanner 50 through line 70.

Upon placement of the probe 20 in the floor of the seawater, measurements are initiated by sending a trigger signal to the electrometer 36 and, simultaneously, to scanner 50 through line 72. Scanner 50, also equipped with an IEEE-488 digital interface, is a programmable, precision switching device connected through line 98 to preamplifier 100. Contacts 130, 132, 134, 136, and 138 are connected respectively to lines 54, 56, 58, 60, and 62. The function of scanner 50 is to sequentially open and close the five switches having contacts 130, 132, 134, 136, and 138, facilitating the connection of individual measurement electrodes of probe 20 to preamplifier 100.

In viewing FIG. 5 it will be appreciated that instrument housing 82 has a lower portion which has a threaded end 142 for engaging the threaded upper portion 144 of probe 20. Bore 146 allows lines 54, 56, 58, 60, and 62 to pass through the lower portion of instrument housing 82 and into probe 20.

The acoustic modem and transducer or receiver 34 is positioned in the upper portion of instrument housing 82. Support 148 is connected to hanger 150 and receiver 34 passes through support 148 at opening 152.

The frequency and duration of switch closing can be programmed by the digital interface of scanner 50 and modified from the computer workstation 24 on ship 10. Reference electrode 52 may be made of platinum and is located in an insulated recess similar to the recesses utilized in the probe. Reference electrode 52 is mounted on the upper surface 154 of instrument housing 82. The reference electrode 52 is connected through line 64 to the low side signal input terminal of electrometer 36. Disk 84 is positioned on the upper portion of probe 20 to stop penetration of probe 20 into the floor of the seawater. Weights 86, 88, 90, and 92 allow the probe and the instrument housing to fall through the seawater and cause the probe 20 to be imbedded in the floor.

FIG. 5a is a side, elevational view of the probe shown in FIG. 3. Probe 20 comprises four tubular members 158, 160, 162, and 164, attached together by couplings 166, 168, 170, and 172 which are threadedly connected to the tubular members. The tubular members may have a total length of 5.1 meters (16.7 feet), with an outside diameter of 8 cm (3.4 inches), and are fabricated from carbon-fiber-reinforced synthetic resin. An insulating material extends through the threaded segments to insure that the probe is not electrically conductive overall since conductivity would interfere with the measurement of static potential differences between the electrodes of the probe and the reference electrode. The wall thickness of the segments may be approximately 2.7 cm. Lower segment 174 may be a cone having a 20 degree angle and may be 22.5 cm in length to facilitate penetration of the floor.

As explained previously, electrode 48 is connected to line 62, electrode 46 is connected to line 60, electrode 44 is connected to line 58, electrode 42 is connected to line 56 and electrode 40 is connected to line 54.

FIG. 6 is a sectional, side elevational view of part of the probe shown in FIG. 5a. Segment 164 has threaded end 176 and threaded end 178. Electrode 46 is connected to line 60 which passes through bore 146. Electrode 46 may be made of platinum and is positioned in an electrode cavity 180.

FIG. 7 is an enlarged, sectional, side elevational view of part of the electrode shown in FIG. 6. Electrode 46 may be connected to segment 164 with a non-conductive screw 182. Electrode 46 is insulated from segment 164 with a gasket 184 which may be constructed of Teflon. Likewise screw 186 passes through electrode 46 and insulated gasket 188 to segment 164.

Line 60 is a triaxial cable having conductor 190 welded with a weld 192 to electrode 46. Electrode cavity 180 may be filled with epoxy resin. Thus, it will be appreciated that the electrodes on the probe are wired by triaxial cable passing through the bore of the probe.

FIG. 8 is a sectional, side elevational view of a connector coupling for the probe shown in FIG. 5a. Coupling 72 has a large diameter portion 194 with threads 196 and 198 above and below the portion 194. The threads allow coupling 172 to join segment 164 to segment 174. Likewise the other couplings are used to join the other segments of the probe in a similar manner. Coupling 172 and the other couplings may be of an electrically insulating material such as nylon. Bore 200 in the coupling 172 is part of bore 146 which extends through the probe.

FIG. 9 is a sectional, side, elevational view of the lower segment of the probe shown in FIG. 5a. Segment 174 has a 20 degree angle and has electrode 48 positioned in electrode cavity 202. Electrode 48 is connected to line 62 which extends through the upper part of segment 174 having inside threads 204. The connection of electrode 48 shown in FIG. 9 is the same as the detail shown in FIG. 7 regarding electrode 46.

A suitable supplier of the acoustic modem 28 and transducer 32 is Datasonics, Inc., P.O. Box 8, Cataumet, Mass. 02534. Electrometer 36 and scanner 50 may be obtained from Keithley Instruments, Inc. P.O. Box 94525, Cleveland, Ohio 44101-9249 and computer 24 may be obtained from Computer City, 3908 Bissonnet, Houston, Tex. 77005. Navigation system 74 may be an Accufix Precision Navigation Receiver from Megapulse, Inc., 8 Preston Court, Bedford, Mass. 01730-2380. Depth digitizer 78 may be a PD$^3$-2000 Precision Depth Digitizer and Display from Sea Beam Instruments, Inc. 141 Washington Street, East Walpole, Mass. 02032-1155.

Thus it will be appreciated that the present invention provides a system, method, and apparatus for offshore petroleum exploration. Electrical potential is measured at various locations and at various depths according to the location of the probe on the floor of the seawater to identify seepage of petroleum on the floor of the seawater thereby indicating likely locations of petroleum reserves. The present invention utilizes known data with a novel probe and related apparatus positioned in the probe and on a ship floating on the body of seawater. The present invention is reliable, efficient, and relatively inexpensive when compared with the present methods of determining possible locations of petroleum reserves.

Although the present invention has been shown and described in a preferred embodiment according to the patent laws of the United States, it will be appreciated that modifications, variations and improvements may be made without departing from the spirit of the invention defined by the claims.

I claim:

1. A system for petroleum exploration in a body of seawater having a floor with sediments, said system including in combination
   a vessel in a body of seawater, said vessel including measurement means, and
   probe means embedded in the floor of said body of seawater whereby seepage of petroleum within sediments of said floor is detected from negative electrical potential which characterizes the sulfide zone in said sediments at an abnormally shallow depth due to the occurrence of petroleum seepage and is transmitted to said measurement means, wherein said measurement means includes a transducer, an acoustic modem connected to said transducer, a computer connected to said acoustic modem, a navigation system connected to said computer, and a depth digitizer connected to said computer.

2. A method for detecting seepage of hydrocarbons into the pore space of sediments below a seafloor location, comprising:
   (a) emplacing an elongated body, the elongated body having an upper end and a lower end and having a reference electrode positioned at a selected distance proximate the upper end and a spaced-apart measurement electrode at a selected distance between the reference electrode and the lower end, the measurement electrode being responsive to the presence of hydrogen sulfide, to a selected depth in sediments having a pore space below the seafloor location;
   (b) measuring the electrical potential of the measurement electrode with respect to the reference electrode to determine the presence of hydrogen sulfide;
   (c) recording the distance from the seafloor to the measurement electrode having a measured potential indicating the presence of hydrogen sulfide;
   (d) comparing the distance recorded in step (c) with the distances from the seafloor to the presence of hydrogen sulfide at other locations in the vicinity of the selected location; and
   (e) determining if seepage of hydrocarbons is detected into the pore space of the sediments by the occurrence of irregular distribution of distance from the seafloor to the presence of hydrogen sulfide in the vicinity of the seafloor location.

3. The method of claim 2 wherein the probe is emplaced by dropping the elongated body in free-fall while attached to a cable.

4. The method of claim 2 wherein the distance from the seafloor to the presence of hydrogen sulfide at other locations in the vicinity of the selected location of step (d) is determined from a map of the regional, normal uniform distance.

5. The method of claim 2 wherein the electrodes are platinum.

6. A method of mapping the depth of the presence of hydrogen sulfide below the seafloor to indicate the occurrence of seepage of hydrocarbons through pore space of the sediments toward the seafloor, comprising:
   (a) emplacing a probe to a selected depth in sediments having a pore space at a plurality of selected locations below a seafloor, the probe having a reference electrode and a measurement electrode, the measurement electrode being responsive to the presence of hydrogen sulfide;
   (b) measuring the electrical potential of the measurement electrode with respect to the reference electrode at each selected location;
   (c) recording the distance from the seafloor to a measurement electrode having a measured potential indicating the presence of hydrogen sulfide at each location; and
   (d) plotting the distance recorded in step (c) at the selected locations to form a map of the depth of hydrogen sulfide.

7. A method for detecting the presence of pollution in the pore space of sediments near the seafloor at a selected location, comprising:
   (a) emplacing a probe to a selected depth in sediments having a pore space below the seafloor, the probe having a reference electrode and a measurement electrode, the measurement electrode being responsive to the presence of hydrogen sulfide;
   (b) measuring the electrical potential of the measurement electrode with respect to the reference electrode;
   (c) from the measured potentials of step (b), determining if pollution is present in the pore space at the selected location by determining if surficial modification of hydrogen sulfide concentration is present at the selected depth.

8. Apparatus for measuring the distance from the seafloor to the sulfide zone in sediments, comprising:
   an elongated body having an upper end, a lower end, and outer surface and having a reference electrode positioned at a selected distance proximate the upper end and a spaced-apart measurement electrode at a selected distance between the reference electrode and the lower end and making an even surface with the outer surface, the spaced-apart measurement electrode being responsive to the presence of hydrogen sulfide;
   means for measuring the electrical potential between the reference electrode and the measurement electrode;
   means for transmitting the measurements of electrical potential to a location above the water surface; and
   means for recording the measurements at the location above the water surface.

9. The apparatus of claim 8 wherein the electrodes are platinum.

* * * * *